US012638149B2

(12) United States Patent
Arteaga

(10) Patent No.: US 12,638,149 B2
(45) Date of Patent: May 26, 2026

(54) RETRACTABLE LANDSCAPE LIGHT DEVICE

(71) Applicant: Julio Arteaga, Long Beach, CA (US)

(72) Inventor: Julio Arteaga, Long Beach, CA (US)

(*) Notice: Subject to any disclaimer, the term of this patent is extended or adjusted under 35 U.S.C. 154(b) by 0 days.

(21) Appl. No.: 19/225,622

(22) Filed: Jun. 2, 2025

(65) Prior Publication Data

US 2025/0290609 A1 Sep. 18, 2025

Related U.S. Application Data

(63) Continuation-in-part of application No. 18/436,122, filed on Feb. 8, 2024, now abandoned.

(60) Provisional application No. 63/471,093, filed on Jun. 5, 2023.

(51) Int. Cl.

| | |
|---|---|
| ***F21V 21/15*** | (2006.01) |
| ***F21S 9/02*** | (2006.01) |
| ***F21V 21/22*** | (2006.01) |
| ***F21V 23/00*** | (2015.01) |
| ***F21V 23/04*** | (2006.01) |
| ***F21V 31/00*** | (2006.01) |
| *F21W 131/109* | (2006.01) |
| *F21Y 113/17* | (2016.01) |
| *F21Y 115/10* | (2016.01) |

(52) U.S. Cl.

CPC ................ *F21S 9/02* (2013.01); *F21V 21/15* (2013.01); *F21V 21/22* (2013.01); *F21V 23/001* (2013.01); *F21V 23/006* (2013.01); *F21V 23/0435* (2013.01); *F21V 23/0464* (2013.01); *F21V 31/005* (2013.01); *F21W 2131/109* (2013.01); *F21Y 2113/17* (2016.08); *F21Y 2115/10* (2016.08)

(58) Field of Classification Search

CPC .. F21S 9/02; F21V 21/15; F21V 21/22; F21V 23/001; F21V 23/006; F21V 23/0435; F21V 23/0464; F21V 31/005; F21W 2131/109; F21W 2131/10; F21Y 2113/17; F21Y 2115/10

See application file for complete search history.

(56) References Cited

U.S. PATENT DOCUMENTS

| | | | | | |
|---|---|---|---|---|---|
| 5,068,773 | A * | 11/1991 | Toth | F21V 21/22 | 362/153.1 |
| 5,130,916 | A * | 7/1992 | Toth | F21V 21/22 | 362/802 |
| 5,163,650 | A * | 11/1992 | Adams | E04H 12/182 | 248/405 |
| 7,775,691 | B2 * | 8/2010 | Burgei, Jr. | F21S 9/02 | 362/153.1 |
| 2018/0119935 | A1 * | 5/2018 | Proeber | B65H 75/42 | |

* cited by examiner

*Primary Examiner* — Evan P Dzierzynski

(74) *Attorney, Agent, or Firm* — Hansen IP Law PLLC

(57) ABSTRACT

A retractable landscape light device is provided. The device is comprised of a retractable landscape light device that provides a landscape light that is stored under a ground surface when not in use and raises from the ground surface when in the use. The light can be automatically raised/lowered via a timer or a light sensor or may be controlled via a mobile application.

20 Claims, 16 Drawing Sheets

RETRACTABLE LANDSCAPE LIGHT DEVICE

CROSS-REFERENCE TO RELATED APPLICATION

The present application is a continuation-in-part of U.S. patent application Ser. No. 18/436,122 which was filed on Feb. 8, 2024, and claims priority to, and the benefit of, U.S. Provisional Application No. 63/471,093, which was filed on Jun. 5, 2023, both of which are incorporated herein by reference in their entirety.

FIELD OF THE INVENTION

The present invention relates generally to the field of lighting. More specifically, the present invention relates to a retractable landscape light device. When not in use, a light of the device remains retracted in a base buried below ground. During use, the light extends from the base, above the ground surface, to illuminate an area. Accordingly, the present disclosure makes specific reference thereto. Nonetheless, it is to be appreciated that aspects of the present invention are also equally applicable to other like applications, devices, and methods of manufacture.

BACKGROUND

Homeowners and businesses alike enhance the aesthetics and security of their properties with outdoor landscape lighting. These illuminating fixtures can create a captivating ambiance, accentuate architectural elements, and showcase the natural beauty of gardens and outdoor spaces. Despite its numerous benefits, one significant challenge that both homeowners and businesses face with outdoor landscape lighting is the relentless and damaging effects of ultraviolet (UV) rays from the sun. More specifically, the sun's powerful UV rays can gradually take a toll on the materials and finishes of these lighting fixtures, causing them to fade and deteriorate over time. The constant exposure to sunlight can be especially harsh on the plastic or resin components commonly used in many outdoor lighting fixtures.

Over time, the once vibrant colors of these fixtures can become dull and washed out, significantly diminishing their visual appeal and potentially compromising the intended lighting effects. As a result, the initial investment made in installing outdoor landscape lighting may not hold up as expected, leading to the need for frequent replacements and increased maintenance costs. Furthermore, the degradation of outdoor lighting due to UV damage not only affects the visual appeal but also raises concerns about the fixtures' longevity and performance. Faded lighting fixtures may emit weaker light, impacting the desired illumination and potentially compromising safety and security aspects that these lights were originally installed to provide.

Therefore, there exists a long-felt need in the art for an improved landscape light. There also exists a long-felt need in the art for a retractable landscape light device that is protected from UV damage when not in use. More specifically, there exists a long-felt need in the art for a retractable landscape light device that is protected from UV damage when not in use by retracting into a base buried underneath a ground surface when not in use.

The subject matter disclosed and claimed herein, in one embodiment thereof, comprises a retractable landscape light device. The device is comprised of a retractable landscape light device that provides a landscape light that is stored under a ground surface when not in use and raises from the ground surface when in the use. The light can be automatically raised/lowered via a timer or a light sensor. In addition, the light can be automatically raised/lowered via mobile application. When not in use, the light is protected from UV damage/impacts via a UV-resistant top cover.

In this manner, the retractable landscape light device of the present invention accomplishes all the forgoing objectives and provides an improved landscape light. To do so, the device provides a landscaping light that is protected from UV damage when not in use by retracting the light into a base buried underneath a ground surface when not in use.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a retractable landscape light device. The device is comprised of a telescopic landscape light that can be raised above and lowered into a ground surface as desired such that the device cannot be easily broken when not in use as it is stored within the ground. In addition, the device is not susceptible to UV damage from constant exposure during the sun above-ground, as the device is stored within the ground when not in use during the day.

The device has a body comprised of a base and at least one telescopic section which may attach to the base (or to a raising and lowering element within the base). The base houses at least one motor which powers at least one raising/lower element that raises the section upwards from the base during use such that the section extends above a ground surface. When not in use, the section (and light of the section) is stored within the base.

The section may have at least one light source that may illuminate any color known in the art. The light may continuously or intermittently illuminate. The light also preferably has a plurality of brightness levels. The light is surrounded by a light enclosure. The enclosure and light are also protected by at least one top cover. The top cover is preferably made from a UV-resistant material to protect against UV damage when the section is retracted into the base and the top cover rests above/in the ground surface.

The raising and lowering of the section from the base can be achieved by a plurality of mechanisms in different embodiments. In one embodiment, the motor is comprised of at least one timer, wherein the motor selectively powers the element at certain times of day. In another embodiment, the top cover may be comprised of at least one light sensor with at least one light threshold. Once the threshold is not met (ex. at sunset), the motor automatically extends the section from the base via the element such that it is above the ground surface. Further, the sensor or timer may be configured via at least one mobile application.

The present invention is also comprised of a first method of using the device. First, a device is provided comprised of a base comprised of at least one motor which powers at least one raising/lowering element, at least one section comprised of at least one light, and at least one sensor. Then, a user can configure at least one light threshold of the sensor, wherein the section is then raised from the base via the element when the threshold is not met, and the section is lowered into and remains in the base when the threshold is exceeded.

In another method of using the device, a device is provided comprised of a base comprised of at least one motor which powers at least one raising/lowering element, at least one section comprised of at least one light, and at least one timer. Then, a user can configure a first time and a second time of the timer, wherein the section is raised from the base via the element at the first time and the section is lowered and remains within the base at the second time.

In a third method of using the device, a device is provided comprised of a base comprised of at least one motor which powers at least one raising/lowering element, at least one section comprised of at least one light, at least one timer, at least one sensor, and a mobile application. Then, a user can use the mobile application to manually raise and retract the section from the base via the element.

Accordingly, the retractable landscape light device of the present invention is particularly advantageous as it provides an improved landscape light that is protected from UV damage when not in use by retracting the light into a base buried underneath a ground surface when not in use. In this manner, the retractable landscape light device overcomes the limitations of existing landscaping lights known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
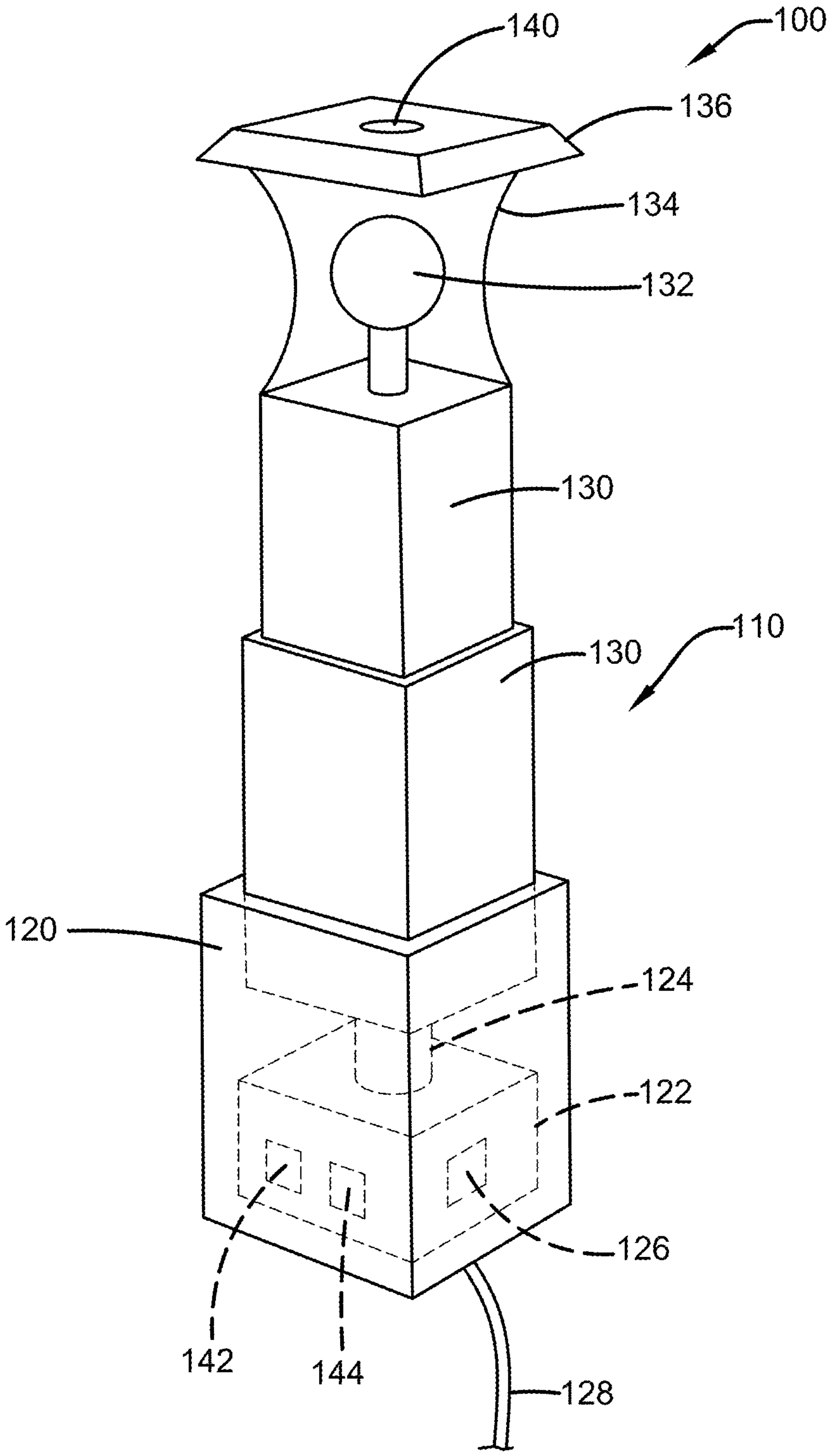
FIG. 1 illustrates a perspective view of one potential embodiment of a retractable landscape light device of the present invention while extended in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved landscape light. There also exists a long-felt need in the art for a retractable landscape light device that is protected from UV damage when not in use. More specifically, there exists a long-felt need in the art for a retractable landscape light device that is protected from UV damage when not in use by retracting into a base buried underneath a ground surface when not in use.

The present invention, in one exemplary embodiment, is comprised of a retractable landscape light device comprised of a telescopic landscape light that can be raised above and lowered into a ground surface as desired. In this manner, the device cannot be easily broken when not in use as it is stored within the ground. In addition, the device is not susceptible to UV damage from constant exposure during the sun above-ground, as the device is stored within the ground when not in use during the day.

The device has a body comprised of a base and at least one telescopic section which may attach to the base (or to a raising and lowering element within the base). The base houses at least one motor. The motor powers at least one raising/lower element that raises the section upwards from the base during use such that the section extends above a ground surface. When not in use, the section (and light of the section) is stored within the base.

The section may have at least one light source that may illuminate any color known in the art. The light may continuously or intermittently illuminate and preferably has a plurality of brightness levels. The light is surrounded by a light enclosure. The enclosure and light are also protected by at least one top cover. The top cover is preferably made from a UV-resistant material to protect against UV damage when the section is retracted into the base and the top cover rests above/in the ground surface.

The raising and lowering of the section from the base can be achieved by a plurality of mechanisms in different embodiments. In one embodiment, the motor is comprised of at least one timer, wherein the motor selectively powers the element at certain times of day. In another embodiment, the top cover may be comprised of at least one light sensor with at least one light threshold. Once the threshold is not met (ex. at sunset), the motor automatically extends the section from the base via the element such that it is above the ground surface. Further, the sensor or timer may be configured via at least one mobile application.

The present invention is also comprised of a first method of using the device. First, a device is provided comprised of a base comprised of at least one motor which powers at least one raising/lowering element, at least one section comprised of at least one light, and at least one sensor. Then, a user can configure at least one light threshold of the sensor, wherein the section is then raised from the base via the element when the threshold is not met, and the section is lowered into and remains in the base when the threshold is exceeded.

In another method of using the device, a device is provided comprised of a base comprised of at least one motor which powers at least one raising/lowering element, at least one section comprised of at least one light, and at least one timer. Then, a user can configure a first time and a second time of the timer, wherein the section is raised from the base via the element at the first time and the section is lowered and remains within the base at the second time.

In a third method of using the device, a device is provided comprised of a base comprised of at least one motor which powers at least one raising/lowering element, at least one section comprised of at least one light, at least one timer, at least one sensor, and a mobile application. Then, a user can use the mobile application to manually raise and retract the section from the base via the element.

Accordingly, the retractable landscape light device of the present invention is particularly advantageous as it provides an improved landscape light that is protected from UV damage when not in use by retracting the light into a base buried underneath a ground surface when not in use. In this manner, the retractable landscape light device overcomes the limitations of existing landscaping lights known in the art.

Referring initially to the drawings, FIG. 1 illustrates a perspective view of one potential embodiment of a retractable landscape light device 100 of the present invention while extended in accordance with the disclosed architecture. The device 100 is comprised of a telescopic landscape light that can be raised above and lowered into a ground surface 10 as desired. As a result, the device 100 cannot be easily broken when not in use as it is stored within the ground 10. In addition, the device 100 is not susceptible to UV damage from constant exposure to the sun while above-ground, as the device 100 is stored within the ground when not in use during the day.

Figure 2:
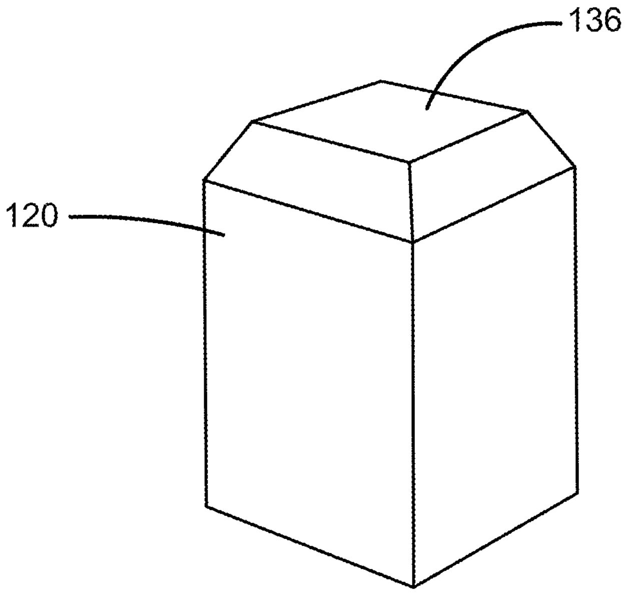
FIG. 2 illustrates a perspective view of one potential embodiment of a retractable landscape light device of the present invention while retracted in accordance with the disclosed architecture.
Figure 3:
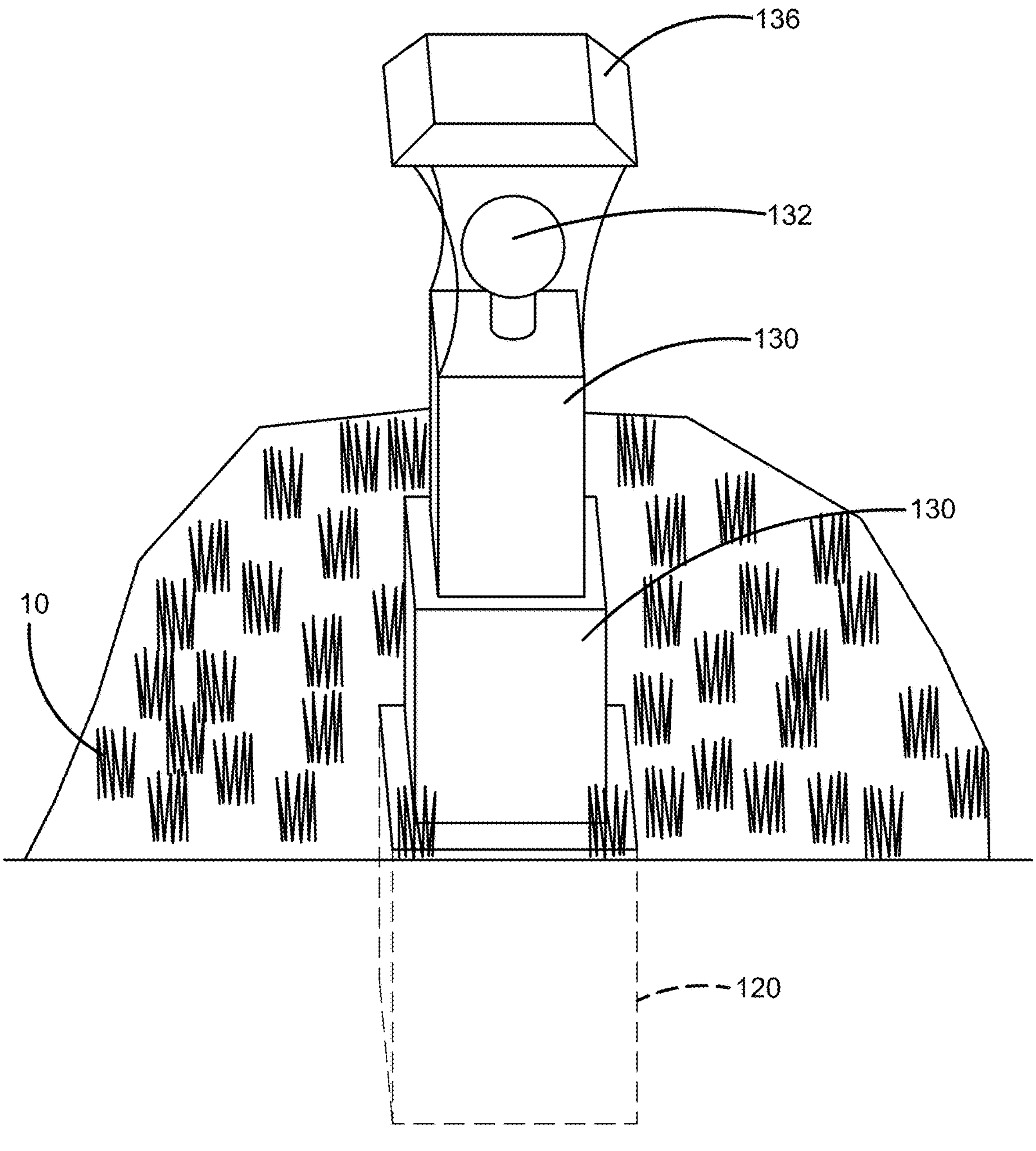
FIG. 3 illustrates a perspective view of one potential embodiment of a retractable landscape light device of the present invention while extended above a ground surface in accordance with the disclosed architecture.
Figure 9:
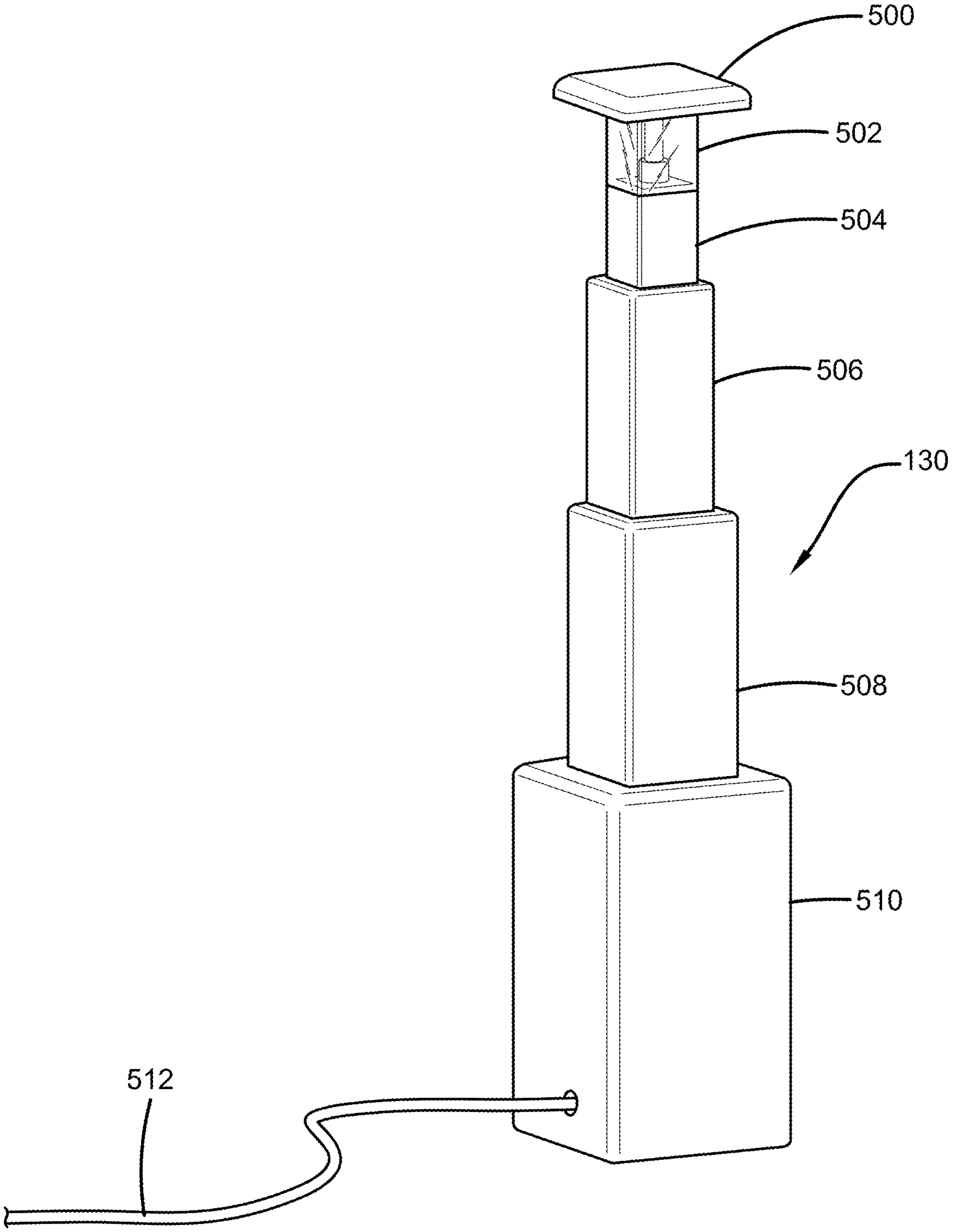
FIG. 9 illustrates a perspective view of one potential embodiment of a retractable landscape light device of the present invention while extended in accordance with the disclosed architecture.

The device 100 has a body 110 comprised of a base 120 and at least one telescopic section 130 which may attach to the base 120 (or to a raising and lowering element 124 within the base 120). The body 110 may be made from any material known in the art, but is preferably made from a rigid plastic material. The base 120 houses at least one motor 122 which powers at least one raising/lower element 124. The element 124 raises the section 130 upwards from the base 120 during use such that the section 130 extends above a ground surface 10, as seen in FIG. 3. When not in use, the section 130 (and light 132 of the section 130) is stored within the base 120, as seen in FIG. 2. The motor 122 is preferably, but not limited to, an electric motor. The element 124 may be any type known in the art such as but not limited to a hydraulic piston, a track and channel, a motorized belt, etc. that may be powered by the motor 122. The motor 122 is powered by at least one battery 126. The battery 126 receives power from at least one power cable 512 which may be any type of power cord or wiring known in the art, as seen in FIG. 9. The power cable 512 connects to an external AC source, which is converted internally to low-voltage DC power suitable for motor 526 and LED 514 operation.

Figure 11:
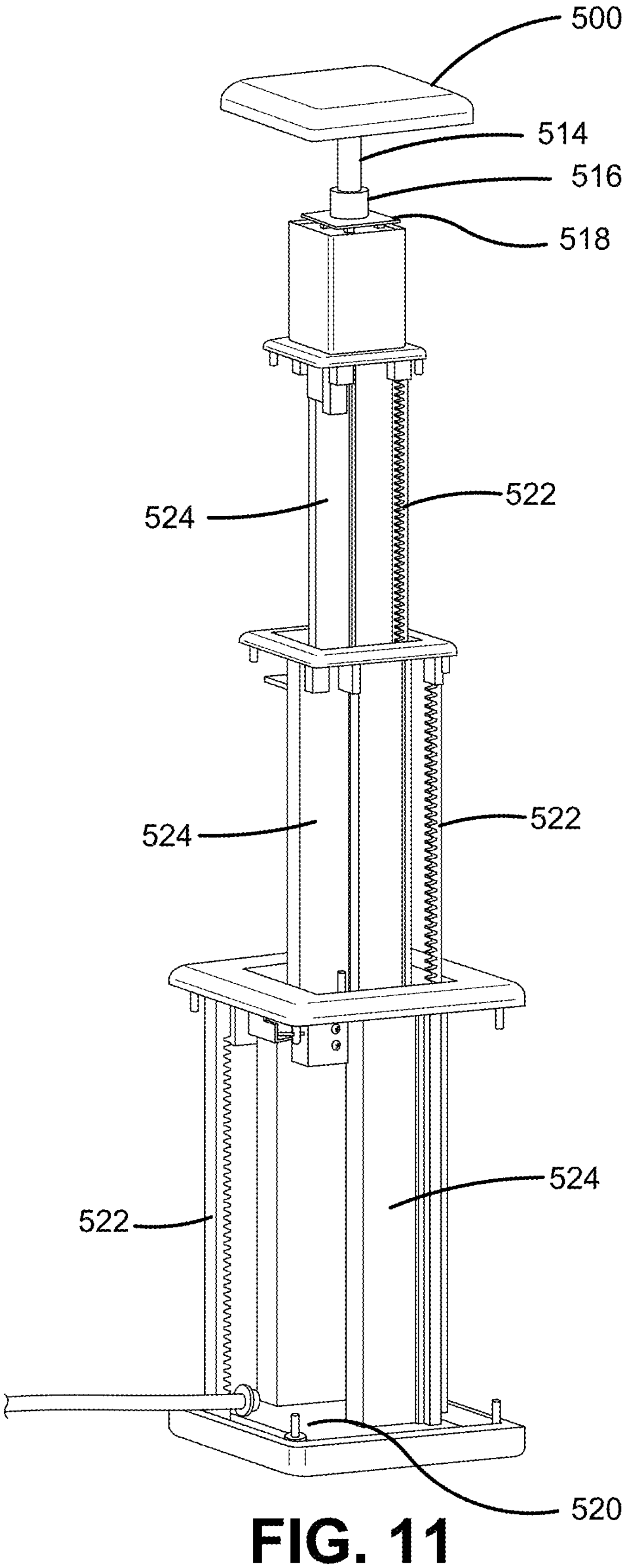
FIG. 11 illustrates a perspective view of one potential embodiment of a retractable landscape light device of the present invention while extended wherein the inner structures of each segment can be observed in accordance with the disclosed architecture.
Figure 12:
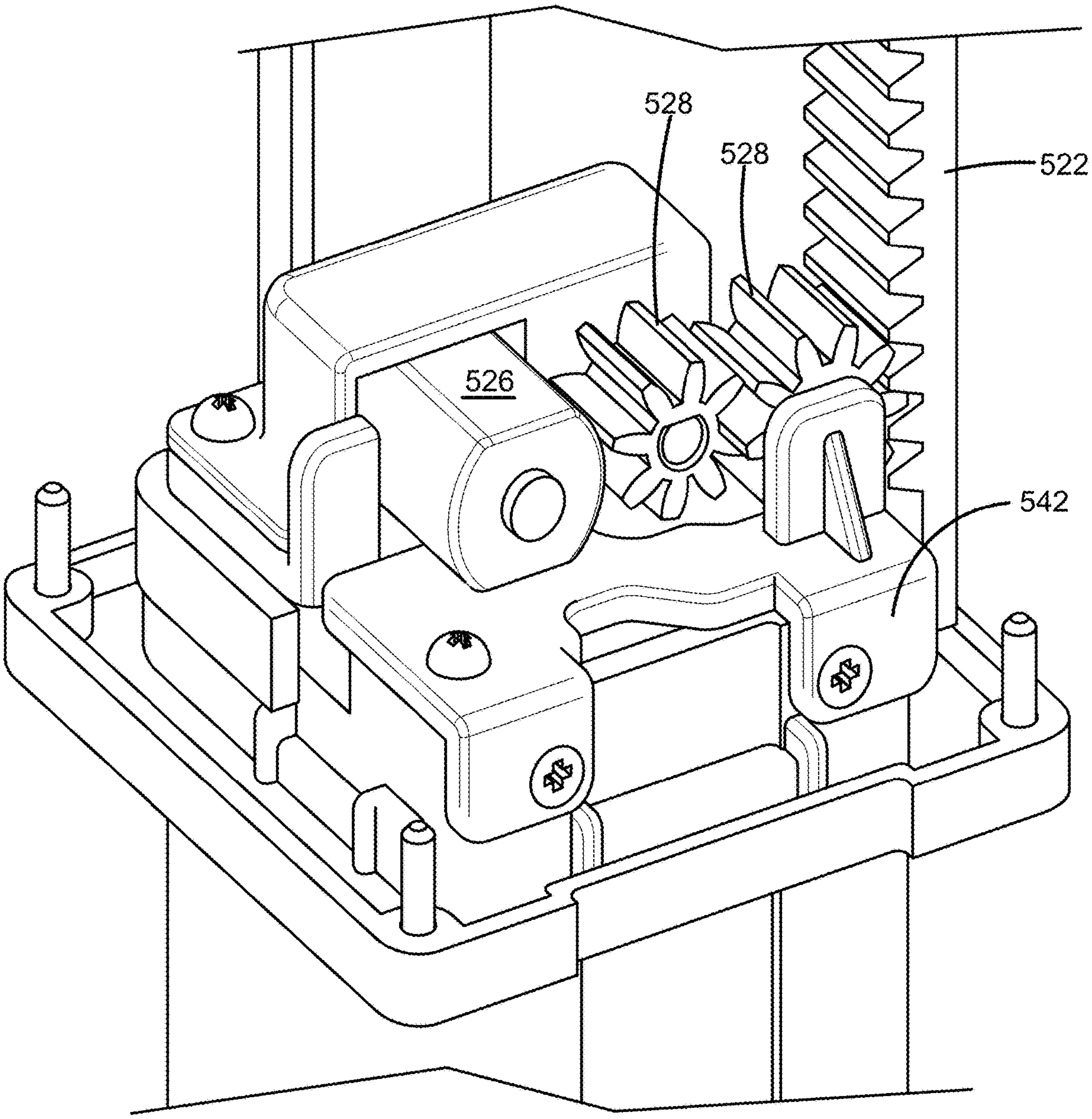
FIG. 12 illustrates an enhanced perspective view of one potential embodiment of a retractable landscape light device of the present invention while extended and between various segments can be observed in accordance with the disclosed architecture.
Figure 13:
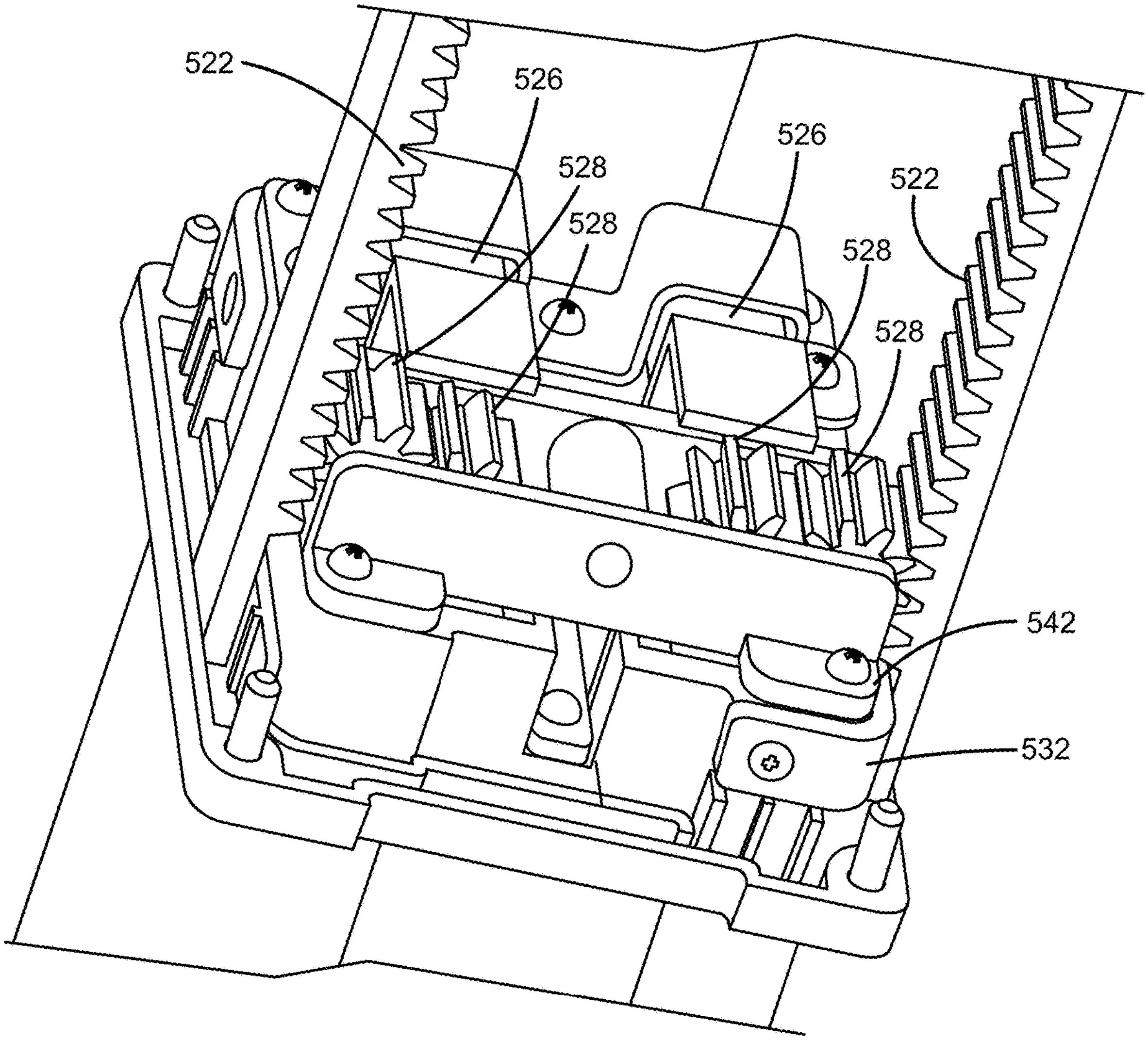
FIG. 13 illustrates an enhanced perspective view of one potential embodiment of a retractable landscape light device of the present invention while extended and between various segments can be observed in accordance with the disclosed architecture.
Figure 14:
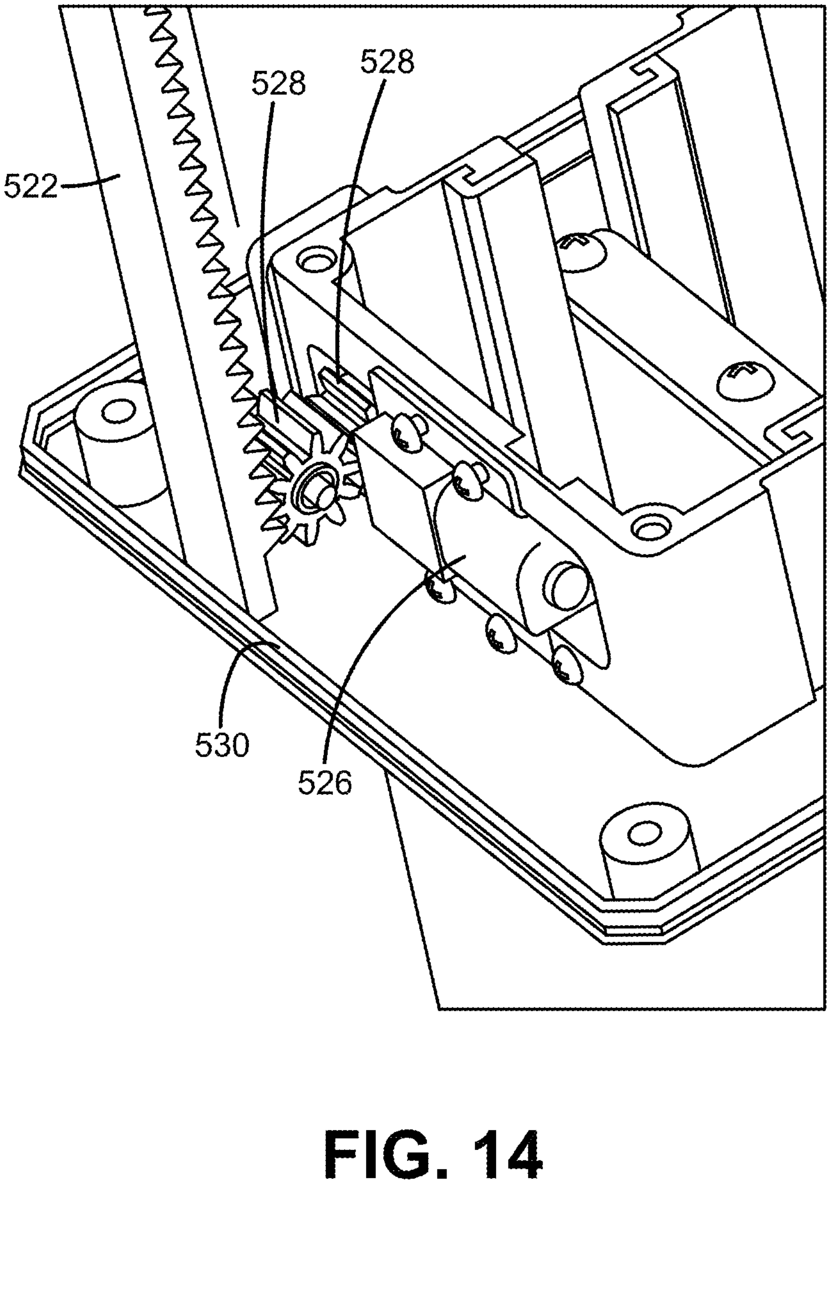
FIG. 14 illustrates an enhanced perspective view of one potential embodiment of a retractable landscape light device of the present invention while extended and between various segments can be observed in accordance with the disclosed architecture.

The section(s) 130 may have any appearance and style in different embodiments. In an embodiment with multiple sections 130, the sections 130 are telescopic such that they can retract into the base 120 (below the ground surface 10) when not in use. In another embodiment, the section(s) 130 is not telescopic and is a singular piece of material. In one embodiment, the telescoping section 130 is comprised of a first stage retractable pole 504, a second stage retractable pole 506, and a third stage retractable pole 508, as seen in FIG. 9. These poles 504,506,508 extend vertically from a main body 510, which encloses the structural supports and control components. Each pole stage 504,506,508 may include at least one gear rack 522 to convert rotational motion into vertical motion and a guiding block 524 to stabilize and align the poles 504,506,508 during travel, as seen in FIG. 11. The motion is driven by one or more motors 526 secured within a motor mounting frame 540. The motors engage the gear racks 522 via gears 528 to extend or retract the poles. The connection between the various stages can be seen in FIGS. 12, 13, and 14.

The section 130 may have at least one light source 132. The light source 132 may be any type of light, such as but not limited to an LED light, that may illuminate any color known in the art. The light 132 may continuously or intermittently illuminate. The light 132 also preferably has a plurality of brightness levels. The light 132 is surrounded by a light enclosure 134. The enclosure 134 is preferably transparent and also waterproof to protect the light 132 from water damage when above a ground surface 10. In one embodiment, the light source 132 may be a G4 LED 514 mounted within an LED frame 516, and controlled by a PCB for LED 518, as seen in FIG. 11. The core of the lighting system may include a main PCBA 520 that manages motor control, sensor input, and LED switching.

Figure 4:
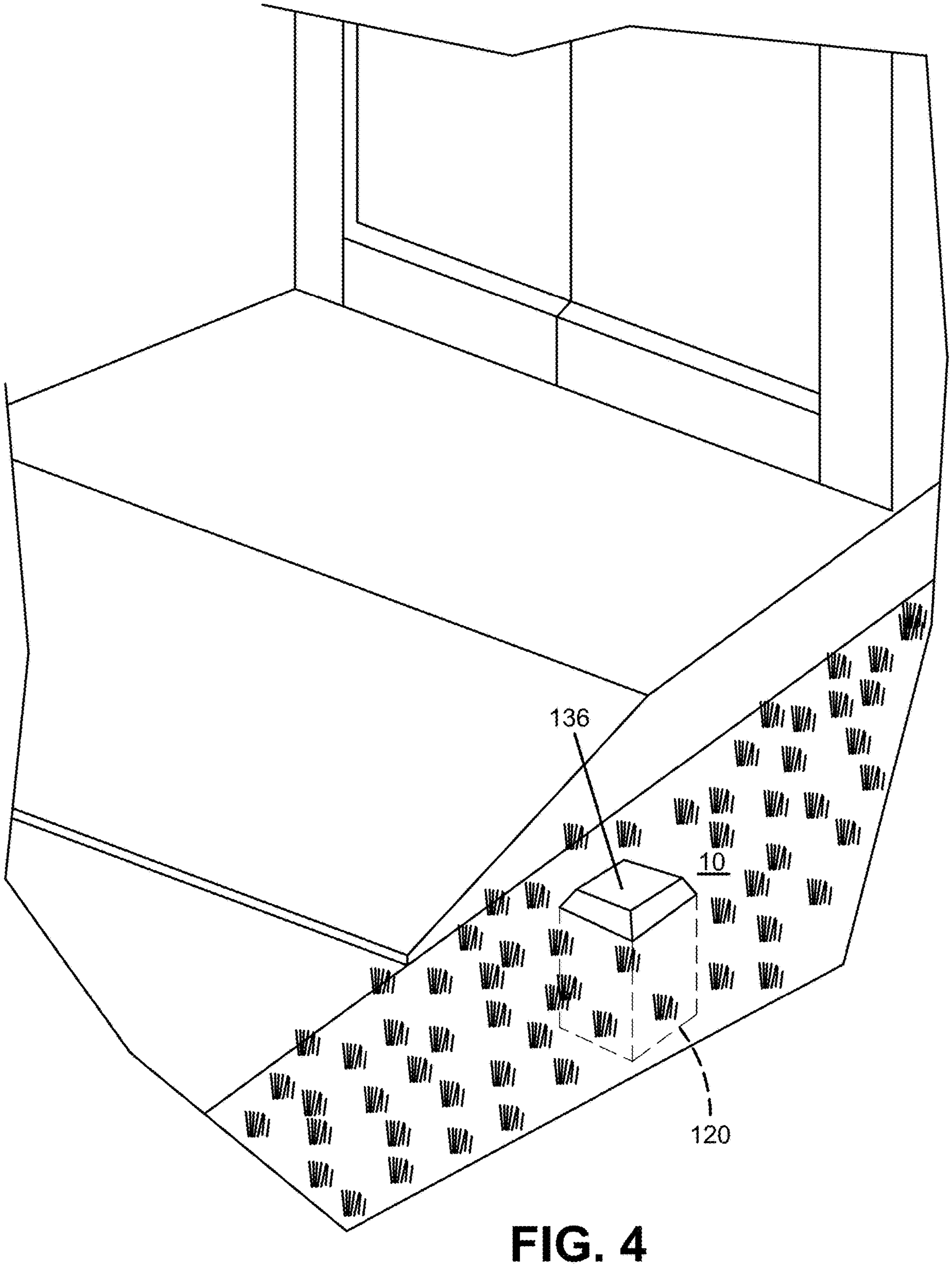
FIG. 4 illustrates a perspective view of one potential embodiment of a retractable landscape light device of the present invention while retracted in a ground surface in accordance with the disclosed architecture.

The enclosure 134 and light 132 are also protected by at least one top cover 136. The top cover 136 may be made of the same material and style as the body 110. The top cover 136 is preferably made from a UV-resistant material to protect against UV damage when the section 130 is retracted into the base 120 and the top cover 136 rests above/in the ground surface 10. When the section 130 is retracted below the ground surface 10 (as seen in FIG. 4), the cover 136 ensures the light 132 cannot be stepped on and become broken. In another embodiment, the main structure may further include a top cover 500 and a clear cover 502 that protect internal components while allowing light to pass through, as seen in FIG. 9.

Figure 15:
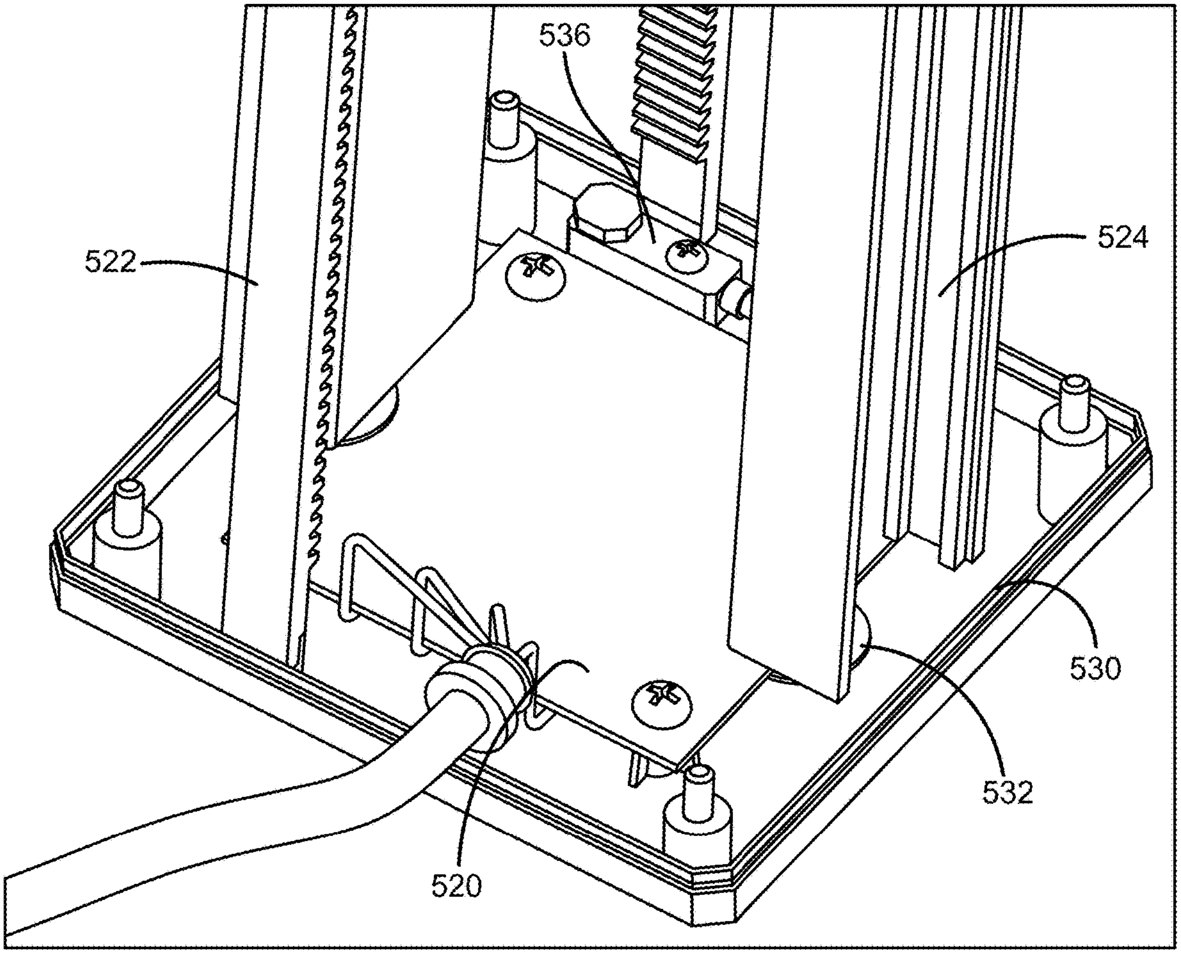
FIG. 15 illustrates an enhanced perspective view of a base of one potential embodiment of a retractable landscape light device of the present invention while extended in accordance with the disclosed architecture.

The raising and lowering of the section 130 from the base 120 can be achieved by a plurality of mechanisms in different embodiments. In one embodiment, the motor 122 is comprised of at least one timer 142. In this embodiment, the motor 122 selectively powers the element 124 at certain times of day. By way of example, the timer 142 may communicate with the motor 122 such that the section 130 is raised above the ground surface 10 at the time of sunset and lowered back into the base 120 at the time of sunrise (or at any other times programmed by the user). This may be accomplished via a DC12V power switch, programmable timer and relay 142, coordinated through the main PCBA 520, as seen in FIG. 15. The system may use an AC110V input that is converted to a 1000 W, 83A DC12V output routed through the timer and relay.

Figure 16:
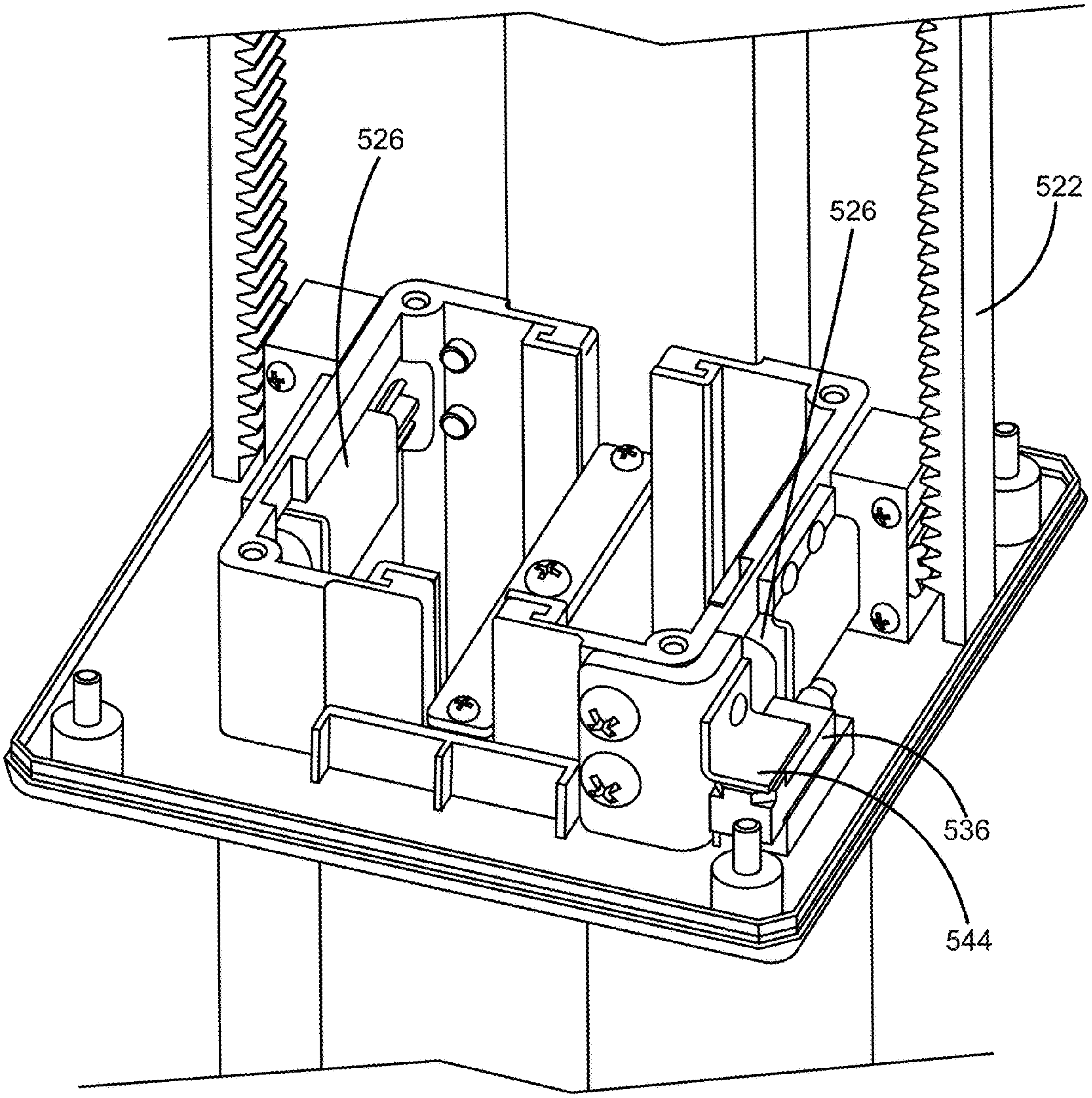
FIG. 16 illustrates an enhanced perspective view of one potential embodiment of a retractable landscape light device of the present invention while extended and between various segments can be observed in accordance with the disclosed architecture.

In another embodiment, the top cover 136 may be comprised of at least one light sensor 140. The sensor 140 may have at least one light threshold which may be measured in units such as but not limited to lumens, lux, etc. Once the threshold is not met (ex. at sunset), the motor 122 automatically extends the section 130 from the base 120 via the element 124 such that it is above the ground surface 10. When the threshold of the sensor 140 is met, the section 130 will remain retracted in the base 120 below the ground surface 10. In this manner, the section 130 automatically raises and lowers as needed in response to the surrounding lighting conditions of the device 100. A stop sensor 536, which may include a sensor block 544, is positioned at both the top and bottom ends of the pole assembly 130. The top stop sensor 536. As seen in FIG. 16, detects full extension and triggers LED activation. The bottom stop sensor 536. As seen in FIG. 15, detects retraction and shuts off the light. Seal rings 530 protect joints and sliding parts from moisture and debris, and stop blocks 532 prevent overtravel. Drive gears for the poles are held within a gear mounting frame 542.

Figure 5:
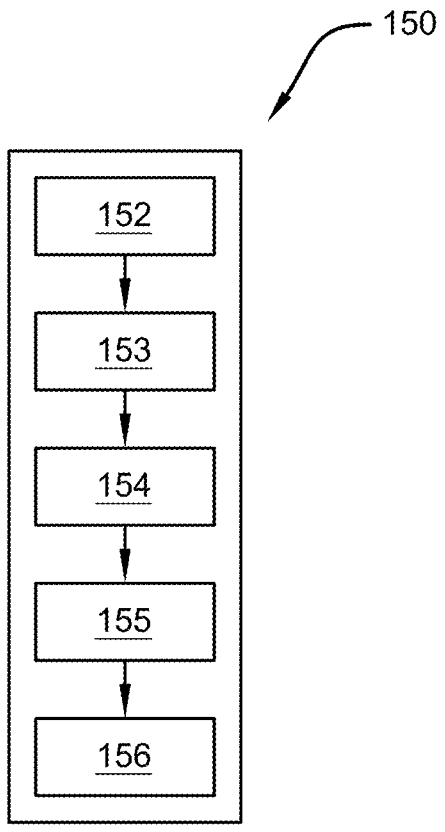
FIG. 5 illustrates a graphical view of functions of a mobile application of one potential embodiment of a retractable landscape light device of the present invention in accordance with the disclosed architecture.

Further, the sensor 140 or timer 142 may be configured via at least one mobile application 150 that is in wireless communication with the motor 122 via at least one wireless transmitter 144 such as but not limited to Bluetooth or Wi-Fi. The mobile application 150 has a plurality of functions, as seen in FIG. 5, including: configuring the time(s) of day the section 130 raises and lowers (152), configuring the brightness/color of the light 132 (153), configuring the light threshold(s) of the sensor 140 (154), configuring the times at which the section is raised/lowered via the timer 142 (155), and also allowing a user to manually raise/lower the section 130 as needed (156). Multiple devices 100 may be connected in parallel via the relay to create a synchronized multi-unit lighting system.

Figure 10:
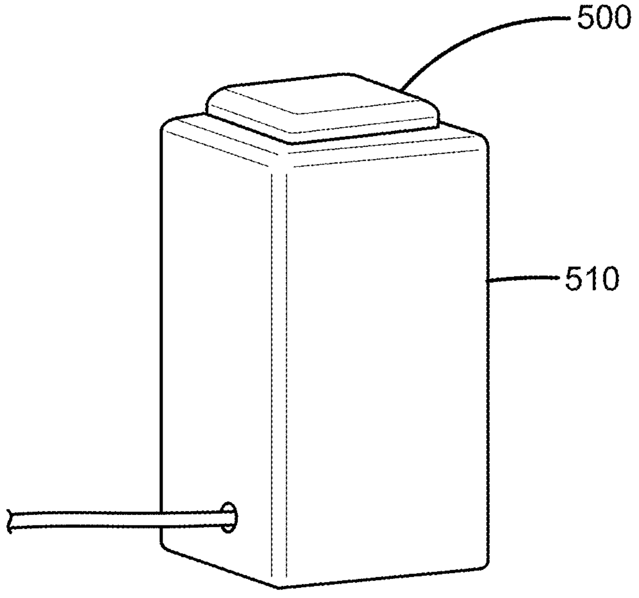
FIG. 10 illustrates a perspective view of one potential embodiment of a retractable landscape light device of the present invention while retracted in accordance with the disclosed architecture.

In one embodiment, the light 132 automatically begins illuminating when the section 130 is raised and continues to illuminate until the section 130 is lowered back into the base 120. In another embodiment, the light 132 may illuminate after a period of time has passed since the section 130 has been raised from the base 120 (ex. 15 seconds) and continue illuminating until the section 130 is lowered back into the base 120. During extension, the retractable poles 504, 506, and 508 move upward simultaneously while the main body 510 remains fixed. The guiding blocks 524 maintain alignment as the motors 526 drive the gear racks 522. Once the top stop sensor 536 is engaged, motion halts and the LED 514 activates. During retraction, the poles descend (as seen in FIG. 10) until the bottom stop sensor 536 is triggered, deactivating the LED. This coordinated action among mechanical and electrical components ensures reliable performance.

Figure 6:
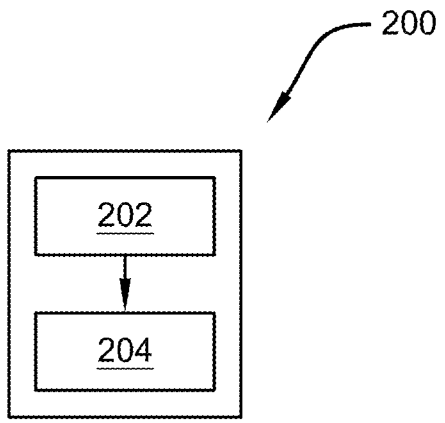
FIG. 6 illustrates a flowchart of a method of using one potential embodiment of a retractable landscape light device of the present invention in accordance with the disclosed architecture.

The present invention is also comprised of a method of using 200 the device 100, as seen in FIG. 6. First, a device 100 is provided comprised of a base 120 comprised of at least one motor 122 which powers at least one raising/lowering element 124, at least one section 130 comprised of at least one light 132, and at least one sensor 140 [Step 202]. Then, a user can configure at least one light threshold of the sensor 140, wherein the section 130 is then raised from the base 120 via the element 124 when the threshold is not met, and the section 130 is lowered into and remains in the base 120 when the threshold is exceeded [Step 204].

Figure 7:
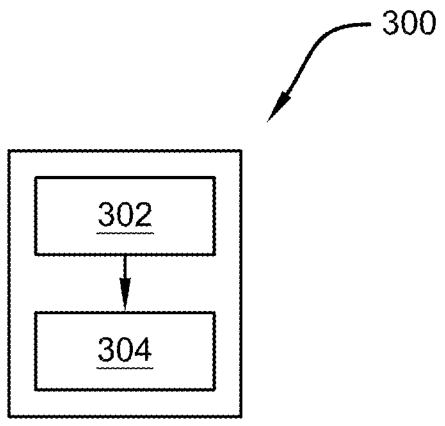
FIG. 7 illustrates a flowchart of a method of using one potential embodiment of a retractable landscape light device of the present invention in accordance with the disclosed architecture.

The present invention is also comprised of a method of using 300 the device 100, as seen in FIG. 7. First, a device 100 is provided comprised of a base 120 comprised of at least one motor 122 which powers at least one raising/lowering element 124, at least one section 130 comprised of at least one light 132, and at least one timer 142 [Step 302]. Then, a user can configure a first time and a second time of the timer 142, wherein the section 130 is raised from the base 120 via the element 124 at the first time and the section 130 is lowered and remains within the base 120 at the second time [Step 304].

Figure 8:
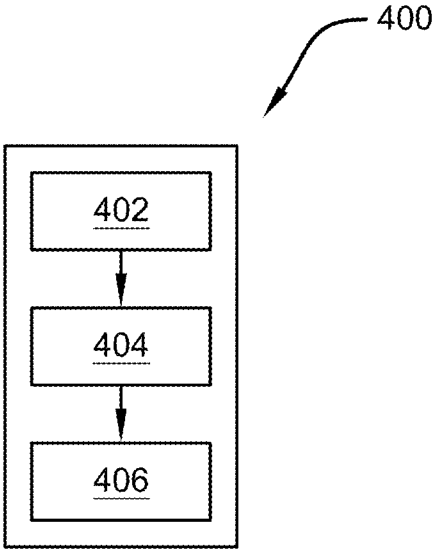
FIG. 8 illustrates a flowchart of a method of using one potential embodiment of a retractable landscape light device of the present invention in accordance with the disclosed architecture.

The present invention is also comprised of a method of using 400 the device 100, as seen in FIG. 8. First, a device 100 is provided comprised of a base 120 comprised of at least one motor 122 which powers at least one raising/lowering element 124, at least one section 130 comprised of at least one light 132, at least one timer 142, at least one sensor 140, and a mobile application 144 [Step 402]. Then, a user can use the mobile application 144 to manually raise and retract the section 130 from the base 120 via the element 124 [Step 404]. The mobile application 144 can also be used to program the functions and parameters of the sensor 140 and timer 142, as mentioned supra [Step 406].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "retractable landscape light device" and "device" are interchangeable and refer to the retractable landscape light device 100 of the present invention.

Notwithstanding the forgoing, the retractable landscape light device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the retractable landscape light device 100 as shown in the FIGS. are for illustrative purposes only, and that many other sizes and shapes of the retractable landscape light device 100 are well within the scope of the present disclosure. Although the dimensions of the retractable landscape light device 100 are important design parameters for user convenience, the retractable landscape light device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A retractable landscape light device comprising:
- a base;
- a section coupled to the base and movable between a retracted position within the base and an extended position above the ground surface, the section comprising:
  - a first stage retractable pole comprised of a first gear rack and a first guiding block;
  - a second stage retractable pole comprised of a second gear rack and a second guiding block;
  - a third stage retractable pole comprised of a third gear rack and a third guiding block
- a motor;
- a light source comprising an LED mounted within an LED frame and controlled by a PCB;
- a light enclosure surrounding the light source, the enclosure being transparent and waterproof;
- a top cover;
- a main PCBA;
- a stop sensor;
- a battery configured to power the motor and the light source; and
- a power cable.

2. The retractable landscape light device of claim 1 further comprised of a light sensor.

3. The retractable landscape light device of claim 1, wherein the top cover is comprised of a UV-resistant material.

4. The retractable landscape light device of claim 1 further comprised of a transmitter.

5. The retractable landscape light device of claim 1, wherein the LED is comprised of a G4 LED.

6. The retractable landscape light device of claim 1, wherein the light source has a plurality of brightness levels.

7. The retractable landscape light device of claim 1, wherein the light source has a plurality of colors.

8. The retractable landscape light device of claim 1, wherein the motor is comprised of an electric motor.

9. A retractable landscape light device comprising:
- a base;
- a section coupled to the base and movable between a retracted position within the base and an extended position above the ground surface, the section comprising:
  - a first stage retractable pole comprised of a first gear rack and a first guiding block;
  - a second stage retractable pole comprised of a second gear rack and a second guiding block;
  - a third stage retractable pole comprised of a third gear rack and a third guiding block
- a motor;
- a light source comprising an LED mounted within an LED frame and controlled by a PCB;
- a light enclosure surrounding the light source, the enclosure being transparent and waterproof;
- a top cover;
- a seal ring;
- a stop block;
- a main PCBA;
- a stop sensor;
- a battery configured to power the motor and the light source; and
- a power cable.

10. The retractable landscape light device of claim 9, wherein the light source has a plurality of brightness levels.

11. The retractable landscape light device of claim 9, wherein the light source has a plurality of colors.

12. The retractable landscape light device of claim 9 further comprised of a light sensor.

13. The retractable landscape light device of claim 9, wherein the top cover is comprised of a UV-resistant material.

14. The retractable landscape light device of claim 9, wherein the motor is comprised of an electric motor.

15. A retractable landscape light device comprising:
- a base;
- a section coupled to the base and movable between a retracted position within the base and an extended position above the ground surface, the section comprising:
  - a first stage retractable pole comprised of a first gear rack and a first guiding block;
  - a second stage retractable pole comprised of a second gear rack and a second guiding block;
  - a third stage retractable pole comprised of a third gear rack and a third guiding block
- a timer;
- a motor;
- a light source comprising an LED mounted within an LED frame and controlled by a PCB;
- a light enclosure surrounding the light source, the enclosure being transparent and waterproof;

a top cover;

a seal ring;

a stop block;

a main PCBA;

a stop sensor;

a battery configured to power the motor and the light source; and a power cable.

16. The retractable landscape light device of claim 15, wherein the light source has a plurality of brightness levels.

17. The retractable landscape light device of claim 15, wherein the light source has a plurality of colors.

18. The retractable landscape light device of claim 15 further comprised of a light sensor.

19. The retractable landscape light device of claim 15, wherein the top cover is comprised of a UV-resistant material.

20. The retractable landscape light device of claim 15, wherein the motor is comprised of an electric motor.

* * * * *